United States Patent
Lee

(10) Patent No.: US 6,931,462 B2
(45) Date of Patent: Aug. 16, 2005

(54) MEMORY CONTROLLER WHICH INCREASES BUS BANDWIDTH, DATA TRANSMISSION METHOD USING THE SAME, AND COMPUTER SYSTEM HAVING THE SAME

(75) Inventor: Hoi-jin Lee, Seongnam (KR)

(73) Assignee: Samsung Electronics Co., Ltd. (KR)

( * ) Notice: Subject to any disclaimer, the term of this patent is extended or adjusted under 35 U.S.C. 154(b) by 217 days.

(21) Appl. No.: 10/619,037

(22) Filed: Jul. 14, 2003

(65) Prior Publication Data

US 2004/0019748 A1 Jan. 29, 2004

(30) Foreign Application Priority Data

Jul. 29, 2002 (KR) ................... 10-2002-0044677

(51) Int. Cl.[7] .............................. G06F 13/00; G06F 3/00
(52) U.S. Cl. ........................ 710/60; 710/52; 711/149
(58) Field of Search .................. 710/58–61, 52, 710/66, 305, 323–315; 711/100, 149

(56) References Cited

U.S. PATENT DOCUMENTS

| | | | | |
|---|---|---|---|---|
| 5,475,437 A | * | 12/1995 | Song ..................... 348/448 |
| 5,687,102 A | * | 11/1997 | Thomson .................. 708/209 |
| 6,715,094 B2 | * | 3/2004 | Jacobs ..................... 710/58 |
| 6,732,247 B2 | * | 5/2004 | Berg et al. .............. 711/149 |
| 6,820,167 B2 | * | 11/2004 | Naffziger et al. ......... 710/38 |

* cited by examiner

*Primary Examiner*—Kim Huynh
(74) *Attorney, Agent, or Firm*—Mills & Onello LLP

(57) ABSTRACT

A memory controller increases the effective bus bandwidth of a computer system. The memory controller includes a first port and a second port which receive and transmit N-bit data values, respectively; a third port receiving and transmitting 2N-bit data values; and a fourth port and a fifth port receiving and transmitting the N-bit data values, respectively. Here, two N-bit data values are simultaneously fetched from a memory device corresponding to the first port via the first port and a memory device corresponding to the second port in response to a command signal and an address input via the third port, the two fetched N-bit data values are combined into a 2N-bit data value, and the 2N-bit data value is transmitted to the third port. In addition, an N-bit data value is fetched from a corresponding memory device via the first port and/or second port in response to a command signal and address input via the fourth port and/or fifth port, and the fetched N-bit data value is transmitted to the fourth port and/or fifth port.

16 Claims, 1 Drawing Sheet

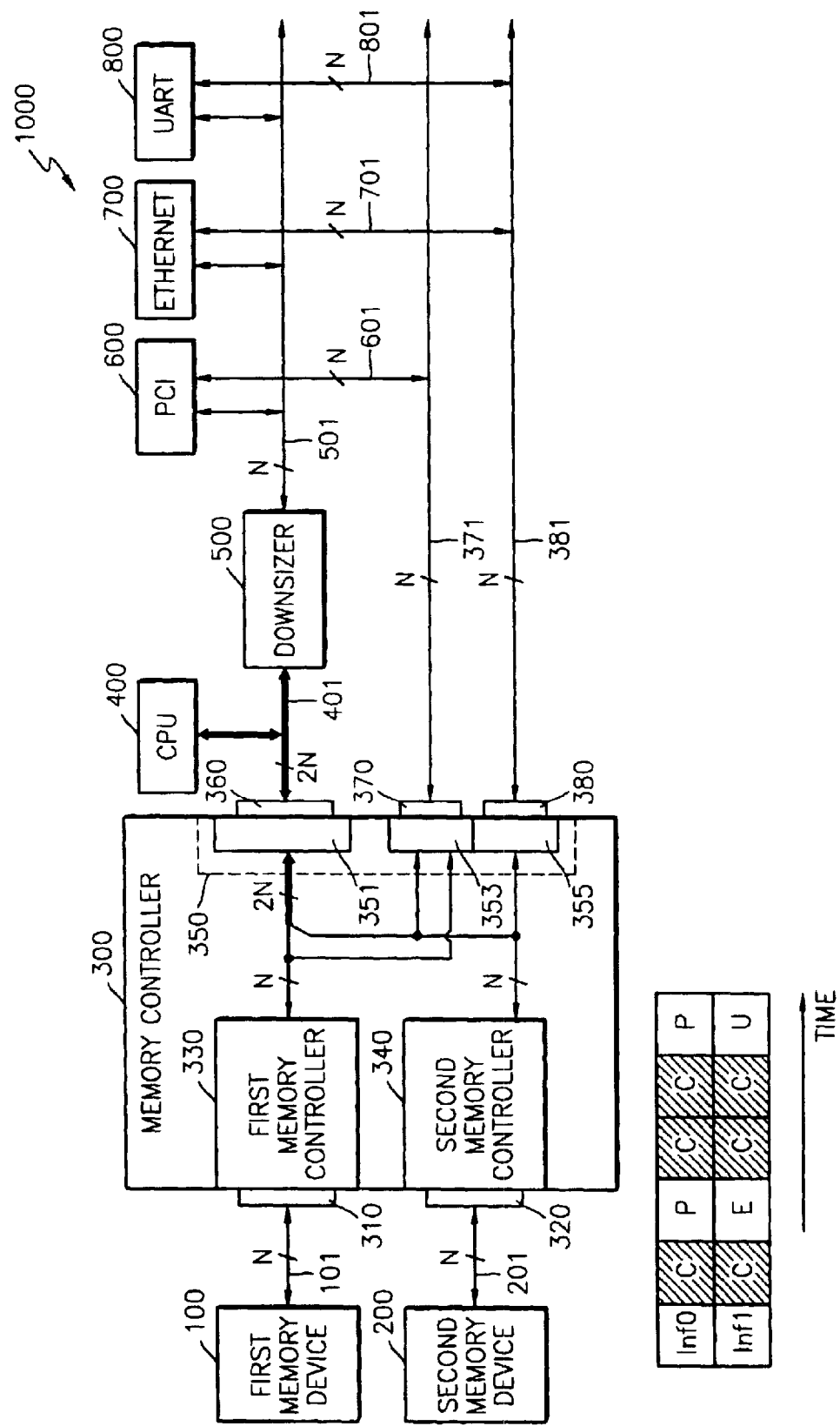

MEMORY CONTROLLER WHICH INCREASES BUS BANDWIDTH, DATA TRANSMISSION METHOD USING THE SAME, AND COMPUTER SYSTEM HAVING THE SAME

BACKGROUND OF THE INVENTION

This application claims the priority of Korean Patent Application No. 2002-44677, filed Jul. 29, 2002 in the Korean Intellectual Property Office (KIPO), which is incorporated herein in its entirety by reference.

1. Field of the Invention

The present invention relates to a memory controller for use in a computer system, and more particularly, to a memory controller which increases the bandwidth of a bus in a multi-bus system, a data transmission method using the same, and a computer system including the memory controller.

2. Description of the Related Art

In general, a computer system consists of three primary subsystems: memory, at least one central processing unit (CPUs), and input/output (I/O) devices.

To satisfy the various needs of users, computers have been developed to be connected to various types of subsystems via a number of communication protocols, including peripheral component interconnect (PCI), Ethernet, or a universal asynchronous receiver/transceiver (UART).

In a computer system, interfaces are required to conduct communication between various types of subsystems. For instance, communication between the memory and the CPU, or between the CPU and the I/O devices may be conducted via a bus.

A bus is a communication line in which several wires are bound with each other in parallel and shared by several subsystems. The maximum bus speed is limited primarily by physical factors such as the physical length of a bus and capacitive loading of the bus.

According to computer architecture theory, a CPU and memory are required to adopt Von Neumann Architecture, i.e., a stored program method. In order to increase the performance of a computer system, both the performance of the CPU and memory should be increased.

However, while CPUs have been developed to increase operating speed, memory, such as dynamic random access memory (DRAM), has been developed to increase memory capacity, while not keeping pace CPU advances in terms of operating speed. Thus, in current systems, the operating speed of memory is remarkably lower than that of CPUs.

Operating speeds of subsystems, such as PCI, Ethernet, and UART, used in computer systems, are also lower than that of the CPU.

Therefore, the performance of a computer system or memory system is evaluated by memory latency or memory access, and memory bandwidth. That is, the smaller the memory latency and the larger the memory bandwidth, the better the performance of the computer system.

To improve the performance of a computer system, the bus bandwidth between the memory and the CPU, i.e., the I/O ports of memory, is increased. This method, however, increases the size of a DRAM chip and causes cross-talk noise between the I/O ports, thereby lowering the operating speed of the computer system.

When the performance of a subsystem such as PCI, Ethernet, or UART, is not developed as rapidly as the development of the performance of a CPU, such a subsystem must be redeveloped to design a computer system which does not restrain the operating speed of the CPU.

For instance, if the CPU is 2N-bit device, and PCI, Ethernet, or UART is an N-bit device (N is 32), the PCI, Ethernet, or UART must be redesigned to be 2N-bit devices in order to design a true 2N-bit computer system.

SUMMARY OF THE INVENTION

The present invention provides a memory controller for maximizing the performance a computer system.

According to one aspect of the present invention, there is provided a memory controller including a first port and a second port which receive and transmit N-bit data values, respectively; a third port receiving and transmitting 2N-bit data values; and a fourth port and a fifth port receiving and transmitting the N-bit data values, respectively. In a first operation, two N-bit data values are simultaneously fetched from a memory device corresponding to the first port via the first port and from a memory device corresponding to the second port in response to a command signal and an address input via the third port, the two fetched N-bit data values are combined into a N-bit data value, and the 2N-bit data value is transmitted to the third port. In a second operation, the N-bit data value is fetched from a corresponding memory device via the first port and/or second port in response to a command signal and address input via the fourth port and/or fifth port, and the fetched N-bit data value is transmitted to the fourth port and/or fifth port.

It is preferable that the 2N-bit data value input via the third port is divided into two N-bit data values and the two N-bit data values are output to the corresponding memory devices via the first and second ports, respectively.

It is preferable that the N-bit data value input via the third port and/or the fourth port is output to the corresponding memory device via the first port and/or the second port.

It is preferable the command signal is a signal for fetching data.

It is preferable that the first and second ports are connected to the corresponding memory devices via independent N-bit buses.

It is preferable that the third port is connected to a 2N-bit device via a 2N-bit bus, and receives and transmits 2N-bit data value.

It is preferable that the third port is connected to a 2N-bit central processing unit (CPU) via a 2N-bit bus and receives and transmits the 2N-bit data value.

It is preferable that the fourth and fifth ports are connected to a corresponding N-bit device via independent N-bit buses.

Here, N is 32.

According to another aspect of the present invention, there is provided a computer system including at least two memory devices which store both data and instructions; at least one 2N-bit device which controls and manages the computer system; at least two N-bit devices exchanging data with the memory devices; and a memory controller which controls the exchange of data among the memory devices and the 2N-bit devices, or among the memory devices and the at least two N-bit devices. The memory controller includes a first port and a second port which receives and transmits N-bit data values from and to corresponding memory devices via corresponding N-bit buses; a third port which receives and transmits 2N-bit data values from and to the 2N-bit device via a 2N-bit bus; and a fourth port and a fifth port which receive and transmit N-bit data values from and to a corresponding N-bit device via a corresponding N-bit bus. In response to a command signal and address that are generated by the 2N-bit device and input via the third port, the memory controller simultaneously fetches the N-bit data values from the memory devices corresponding to the address via the first and second ports, and transmits the fetched 2N-bit data value via the third port. In response to a command signal and address that are generated by the corresponding N-bit device and input via the fourth port and/or the fifth port, the memory controller fetches the N-bit data value from a memory device corresponding to the address via the first port and/or second port and transmits the fetched N-bit data value via the fourth port and/or the fifth port.

It is preferable that the memory controller divides the 2N-bit data value into N-bit data values and outputs the divided N-bit data values to corresponding memory devices via the corresponding first port or second port, the 2N-bit data value being generated by the 2N-bit IP and input via the third port.

It is preferable that the memory controller outputs the N-bit data value to the memory device via the first port and/or the second port, the N-bit data value being generated by the corresponding device and input via the third port and/or the fourth port.

It is preferable that the command signal comprises a signal for fetching data.

According to still another aspect of the present invention, there is provided a data transmission method performed by a memory controller including first and second ports receiving and transmitting N-bit data values, a third port which receives and transmits 2N-bit data values, and fourth and fifth ports which receive and transmit the N-bit data values, the method including receiving at least one of a command signal and address input via the third port, and a command signal and address input via one of the fourth and fifth ports; and simultaneously fetching the N-bit data values from corresponding memory devices via the first and second ports in response to the command signal and address input via the third port, and transmitting the fetched 2N-bit data values, and fetching the N-bit data values from at least one of the corresponding memory devices via the first port and/or the second port in response to the command signal and address input via the fourth port and/or the fifth port, and transmitting the fetched N-bit data value to the fourth port and/or the fifth port.

It is preferable that the 2N-bit data value input via the third port is divided into two N-bit data values and the divided two N-bit data values are output to the corresponding memory devices via the first and second ports.

It is preferable that the N-bit data value input via the third port and/or the fourth port is output to the corresponding memory devices via the first port and/or the second port.

BRIEF DESCRIPTION OF THE DRAWINGS

The above aspect and advantages of the present invention will become more apparent by describing in detail a preferred embodiment thereof with reference to the attached drawing in which:

FIG. 1 is a block diagram of a computer system having a memory controller according to the present invention.

DETAILED DESCRIPTION OF THE INVENTION

FIG. 1 is a block diagram of a computer system 1000 having a memory controller 300. The computer system 1000 of FIG. 1 includes at least two memory devices 100 and 200 that store data and commands, respectively; at least one 2N-bit device, for example CPU 400 that controls and manages the computer system 1000; at least two N-bit units, for example PCI 600, Ethernet 700, and UART 800, that transmit or receive N-bit data values to or from the memory devices 100 and 200; and a memory controller 300 that controls the exchange of 2N-bit or N-bit data values among the memory devices 100 and 200 and the at least one 2N-bit unit or among the memory devices 100 and 200 and the at least two N-bit units 600, 700, and 800.

The memory controller 300 includes a first port 310 and a second port 320 that exchange N-bit data values with the corresponding memory devices 100 and 200, respectively, via corresponding N-bit buses 101 and 201, respectively; a third port 360 that exchanges 2N-bit data values with the at least one 2N-bit unit 400 via a 2N-bit bus 401; a fourth port 370 that exchanges N-bit data values with the corresponding N-bit unit 600 via corresponding N-bit bus 371; and a fifth port 380 that exchanges N-bit data values with the corresponding N-bit units 700 and 800 via a corresponding N-bit bus 381.

In response to a command signal and an address generated by the 2N-bit unit 400 and input via the third port 360, the memory controller 300 simultaneously fetches N-bit data values from the first memory device 100 and N-bit data values from the second memory device 200 corresponding to the address via the first and second ports 310 and 320, and transmits the fetched 2N-bit data value to the 2N-bit unit 400 via the third port 360. For instance, the command signal may be a command signal or load command signal that instructs the 2N-bit unit 400, for example, the CPU, to fetch the 2N-bit data value.

In response to a command signal and an address generated by a corresponding N-bit unit 600, 700, or 800 and input via the fourth port 370 and/or fifth port 380, the memory controller 300 fetches the N-bit data values from the memory devices 100 and 200 corresponding to the address via the first port 310 and/or the second port 320, and transmits the fetched N-bit data values to the corresponding N-bit unit 600, 700, or 800 via the fourth port 370 and/or the fifth port 380.

in addition, the memory controller 300 divides the 2N-bit data value, which is generated by the 2N-bit unit 400 and input via the third port 360, into two N-bit data values and then transmits the divided two N-bit data values to the corresponding memory devices 100 and 200 via the corresponding first and second ports 310 and 320, respectively.

Further, the memory controller 300 outputs the N-bit data value, which is generated by the corresponding N-bit unit 600, 700, or 800 and input from the third port 370 and/or fourth port 380, to the memory devices 100 and 200 via the first port 310 and/or the second port 320.

Referring to FIG. 1, the computer system 1000 includes the first and second memory devices 100 and 200, the memory controller 300, a central processing unit (CPU) 400, a downsizer 500, a peripheral component interconnect (PCI) function block 600, an Ethernet function block 700, and a universal asynchronous receiver/transceiver (UART) function block 800.

According to the present invention, it is assumed that the CPU 400 is a 2N-bit unit, and the PCI function block 600, the Ethernet function block 700, and the UART function block 800 are N-bit function blocks (where N is a natural number such as 32).

The memory devices 100 and 200 are main memory units that store data and instructions that the CPU 400 requires, and are comprised of DRAMs.

The CPU 400 transmits an N-bit address to the first and second memory devices 100 and 200 via the buses 401 and 101, or 401 and 201 so as to call the first and second memory devices 100 and 200 and also, exchanges data with the first and second memory devices 100 and 200. Further, the CPU 400 outputs various control signals, which control the calling of the first and second memory devices 100 and 200 and the exchange of data, to the memory controller 300 via a certain control bus. In other words, the CPU 400 performs overall control and management of the computer system 1000.

The memory controller 300 according to the present invention includes the first and second ports 310 and 320, a first memory controller 330, a second memory controller 340, a port controller 350, and the third through fifth ports 360 through 380. The port controller 350 includes a third port controller 351, a fourth port controller 353, and a fifth port controller 355.

The first port 310 is connected to the first memory device 100 via the N-bit bus 101 and the second port 320 is connected to the second memory device 200 via the N-bit bus 201.

The third port 360 is connected to the downsizer 500 and the CPU 400 via a 2N-bit bus. Each function block 600, 700, or 800 is connected to the downsizer 500 via the N-bit bus 501. The downsizer 500 receives a 2N-bit data value, converts it into N-bit data values, and outputs the N-bit data values.

The fourth port 370 is connected to the PCI function block 600 via the N-bit buses 371 and 601. The fifth port 380 is connected to the Ethernet function block 700 via the N-bit buses 381 and 701 and the fifth port 380 is connected to the UART function block 800 via the N-bit buses 381 and 801.

In response to an address, a write command signal, e.g., a storage command signal, and data output from the CPU 400 or a function block 600, 700, or 800, the first memory controller 330 controls write operations to write the data to certain memory cells of the first memory device 100 which are designated by the address. Otherwise, in response to an address and a read command signal such as a load command signal which are output from the CPU 400 or a function block 600, 700, or 800, the first memory controller 330 controls read operations in which data stored in the memory cells of the first memory device 100, which are designated by the address, is read.

Also, in response to an address, a write command signal, and data output from the CPU 400 or a function block 600, 700, or 800, the second memory controller 340 controls a write operation to write the data to a certain memory cells of the second memory device 200 which are designated by the address. Otherwise, in response to an address and a read command signal output from the CPU 400 or a function block 600, 700, or 800, the second memory controller 340 controls a read operation in which the data stored in the memory cells of the second memory device 200 which are designated by the address, is read.

The third port controller 351 controls the receiving of an N-bit data value output from the first memory device 100 and an N-bit data value output from the second memory device 200, combining the two N-bit data values into a 2N-bit data value, and transmitting the 2N-bit data value to the CPU 400 via the third port 360 and the 2N-bit bus 401.

The fourth port controller-353 receives an N-bit data value output from the first memory device 100 or the second memory device 200 and outputs the received N-bit data value to the PCI function block 600 via the fourth port 370 and the buses 371 and 601.

The fifth port controller 355 receives an N-bit data value output from the first memory device 100 or the second memory device 200 and outputs the received N-bit data value to the Ethernet function block 700 via the fifth port 380 and the buses 381 and 701, or to the UART function block 800 via the fifth part 380 and the buses 381 and 801.

Hereinafter, the operations of the computer system having a memory controller, according to the present invention, will be described with reference to FIG. 1.

First, when the CPU 400 loads (or reads) 2N-bit data values, a 2N-bit address and a certain N-bit command signal for loading (or reading) the 2N-bit data values are input to the memory controller 300 via the 2N-bit bus 401 and the third port 360.

The third port controller 351 divides the 2N-bit address into two N-bit addresses, outputs the divided upper N-bit address and the bit command signal to the first memory controller 330, and outputs the divided lower N-bit address and the bit command signal to the second memory controller 340.

Here, the upper N-bit address indicates N-bit including the most significant bits (MSB) and the lower N-bit indicates N-bit including the least significant bits (LSB). However, the memory controller 300 according to the present invention can also divide the 2N-bit data values into units of N-bit data values in other ways, in a manner that is not necessarily partitioned according to MSB/LSB.

The first memory controller 330 fetches the N-bit data values from the memory cells of the first memory device 100, which are designated by the upper N-bit address via the N-bit bus 101, and outputs the fetched. N-bit data values to the third port controller 351. At the same time, the second memory controller 340 fetches the N-bit data values from the memory cells of the second memory device 200, which are designated by the lower N-bit address, via the N-bit bus 201, and outputs the fetched N-bit data values to the third port controller 351.

The third port controller 351 combines the N-bit data value output from the first memory controller 330 and the N-bit data value output from the second memory controller 340 and transmits the combination result, i.e., a 2N-bit data value, to the CPU 400 via the 2N-bit bus 401.

If the 2N-bit data value is stored in the CPU 400, a 2N-bit address and a certain N-bit command signal for storing the 2N-bit data value are input to the memory controller 300 via the third port 360.

The third port controller 351 divides the 2N-bit address into two N-bit addresses and outputs the divided upper N-bit address, an upper N-bit data value corresponding to the upper N-bit address, and the certain N-bit command signal to the first memory controller 330. The first memory controller 330 transmits the upper N-bit data value to the memory cells of the first memory device, which are designated by the N-bit address, via the first port 310 and the N-bit bus 101.

Also, the third port controller 351 outputs the divided lower N-bit address, the lower N-bit data value corresponding to the lower N-bit address, and the certain N-bit command signal to the second memory controller 340. The second memory controller 340 transmits the lower N-bit data value to the memory cells of the second memory device 200, which are designated by the upper N-bit address, via the second port 320 and the N-bit bus 201.

When the N-bit data value is loaded by the PCI function block 600, an N-bit address and a certain N-bit command signal for loading the N-bit data values are input to the memory controller 300 via the N-bit buses 601 and 371 and the fourth port 370.

The fourth controller 353 outputs the N-bit address and the certain N-bit command signal to one of the first memory controller 330 and the second memory controller 340. The fourth controller 353 is designed to select one of the first and second memory controllers 330 and 340 by software or hardware.

If the fourth controller 353 selects the first memory controller 330, the first memory controller 330 fetches the N-bit data value from the memory cells of the first memory device 100 that are designated by the N-bit address. The fetched N-bit data value is input to the PCI function block 600 via the fourth controller 353 and the N-bit buses 371 and 601.

If the N-bit data value is loaded by the PCI function block 600, the Ethernet function block 700 or the UART function block 800 loads or stores the N-bit data value via the fifth port 380, the fifth port controller 355, and the second memory controller 340.

Accordingly, if the CPU 400 loads or stores 2N-bit data value, the first and second interfaces of the memory controller 300 according to the present invention simultaneously fetch N-bit data value when the N-bit bus 101, the first port 310, and the first memory controller 330 form a first interface and the N-bit bus 201, the second port 320, and the second memory controller 340 form a second interface.

In one embodiment, only one of the first and second interfaces is used when each of the N-bit IPs 600, 700, and 800 loads or stores N-bit data value. The other interface may be used by each of the N-bit IPs 700, 800, and 600.

Referring to FIG. 1, the CPU 400, which is a 2N-bit unit, simultaneously uses the first and second interfaces. While the Ethernet function block 700, which is an N-bit unit, uses the first interface, the PCI function block 600, which is also an N-bit unit, uses the second interface. Referring to FIG. 1, C denotes an interface that the CPU 400 uses, P denotes an interface that the PCI function block 600 uses, E denotes an interface that the Ethernet function block 700 uses, and U denotes an interface that the UART function block 800 uses. For instance, when the PCI function block 600 uses the first interface, the Ethernet function flock 700 may use the second interface. The CPU 400 simultaneously uses the first and second interfaces.

As described above, a memory controller according to the present invention is capable of maximizing the performance of a computer system that uses both an N-bit unit and a 2N-bit unit, without increasing operational frequency. Also, a memory controller and a data transmission method using the same, according to the present invention, increase the memory utilization ratio of a computer system. In addition, bus bandwidth is increased in a computer system using a memory controller according to the present invention.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A memory controller comprising:
a first port and a second port which receive and transmit an N-bit data value, respectively;
a third port receiving and transmitting a 2N-bit data value; and
a fourth port and a fifth port, each receiving and transmitting an N-bit data value;
wherein during a first operation, two N-bit data values are simultaneously fetched from a memory device corresponding to the first port via the first port and from a memory device corresponding to the second port in response to a command signal and an address input received via the third port, the two fetched N-bit data values are combined into a 2N-bit data value, and the 2N-bit data value is transmitted to the third port, and
wherein during a second operation, the N-bit data value is fetched from at least one of the corresponding memory devices via the at least one corresponding first port and second port in response to a command signal and address input via at least one of the fourth port and fifth port, and the fetched N-bit data value is transmitted to the at least one of the fourth port and fifth port.

2. The memory controller of claim 1, wherein the 2N-bit data value input via the third port is divided into two N-bit data values and the two N-bit data values are output to the corresponding memory devices via the first and second ports, respectively.

3. The memory controller of claim 1, wherein the N-bit data value input via the at least one of the third port and the fourth port is output to the corresponding memory device via the at least one of the first port and the second port.

4. The memory controller of claim 1, wherein the command signal comprises a signal for fetching data.

5. The memory controller of claim 1, wherein the first and second ports are connected to the corresponding memory devices via independent N-bit buses.

6. The memory controller of claim 1, wherein the third port is connected to a 2N-bit device via a 2N-bit bus, and receives and transmits the 2N-bit data values.

7. The memory controller of claim 1, wherein the third port is connected to a 2N-bit central processing unit (CPU) via a 2N-bit bus and receives and transmits the 2N-bit data values.

8. The memory controller of claim 1, wherein the fourth and fifth ports are connected to a corresponding N-bit device via independent N-bit buses.

9. The memory controller of claim 1, wherein N is 32.

10. A computer system comprising:
at least two memory devices which store data and instructions;
at least one 2N-bit device which controls and manages the computer system;
at least two N-bit devices exchanging data with the memory devices; and
a memory controller which controls the exchange of data among the memory devices and the 2N-bit device, and among the memory devices and the at least two N-bit devices;
wherein the memory controller comprises:
a first port and a second port which receive and transmit N-bit data values from and to the corresponding memory devices via corresponding N-bit buses;
a third port which receives and transmits 2N-bit data values from and to the 2N-bit device via a 2N-bit bus; and
a fourth port and a fifth port, each receiving and transmitting an N-bit data value from and to a corresponding N-bit device via a corresponding N-bit bus, and
wherein, in response to a command signal and address that are generated by the 2N-bit device and input via the third port, the memory controller simultaneously fetches the N-bit data values from the memory devices corresponding to the address via the first and second ports, combines the N-bit data values to form a fetched 2N-bit data value, and transmits the fetched 2N-bit data value via the third port, and wherein, in response to a command signal and address that are generated by the corresponding N-bit device and input via at least one of the fourth port and the fifth port, the memory controller fetches the N-bit data value from a memory device corresponding to the address via at least one of the first port and the second port and transmits the fetched N-bit data value via at least one of the fourth port and the fifth port.

11. The computer system of claim 10, wherein the memory controller divides the 2N-bit data value into N-bit data values and outputs the divided N-bit data values to the corresponding memory devices via the corresponding first port and second port, the 2N-bit data value being generated by the 2N-bit device and input via the third port.

12. The computer system of claim 10, wherein the memory controller outputs the N-bit data value to the memory device via at least one of the first port and second port, the N-bit data value being generated by the corresponding N-bit device and input via at least one of the third port and the fourth port.

13. The computer system of claim 10, wherein the command signal comprises a signal for fetching data.

14. A data transmission method performed by a memory controller including first and second ports receiving and transmitting N-bit data values, a third port which receives and transmits 2N-bit data values, and fourth and fifth ports which receive and transmit N-bit data values, the method comprising:

receiving at least one of a command signal and address input via the third port, and a command signal and address input via at least one of the fourth and fifth ports; and simultaneously fetching N-bit data values from corresponding memory devices via the first and second ports in response to the command signal and address input via the third port, combining them to form a fetched 2N-bit data value and transmitting the fetched 2N-bit data value, and fetching the N-bit data value from at least one of the corresponding memory devices via at least one of the first port and the second port in response to the command signal and address input via the at least one of the fourth port and the fifth port, and transmitting the fetched N-bit data value to the at least one of the fourth port and the fifth port.

15. The method of claim 14, wherein the 2N-bit data value input via the third port is divided into two N-bit data values and the divided two N-bit data values are output to the corresponding memory devices via the first and second ports.

16. The method of claim 14, wherein the N-bit data value input via the at least one of the third port and the fourth port is output to the corresponding memory devices via the at least one of the first port and the second port.

* * * * *